United States Patent [19]

Van Oosterhout

[11] 3,884,890

[45] May 20, 1975

[54] PREPARATION OF TRANSPARENT AND THERMOSTABLE COPOLYMERS

[75] Inventor: Johannes T. Van Oosterhout, Leersum, Netherlands

[73] Assignee: Stamicarbon, N.V., Geleen, Netherlands

[22] Filed: Sept. 15, 1971

[21] Appl. No.: 180,901

Related U.S. Application Data

[63] Continuation-in-part of Ser. No. 55,969, July 17, 1970, abandoned, which is a continuation-in-part of Ser. No. 810,820, March 26, 1969, abandoned.

[30] Foreign Application Priority Data

Mar. 28, 1968 Netherlands................. 6804333

[52] U.S. Cl. ..... 260/87.5 C; 260/78.5 CL; 260/806; 260/80.73; 260/80.76; 260/80.77; 260/80.78; 260/80.8; 260/80.81; 260/87.5 B; 260/896; 260/899; 260/888

[51] Int. Cl............................ C08f 1/11; C08f 15/02

[58] Field of Search ................... 260/87.5 C, 87.5 B

[56] References Cited

UNITED STATES PATENTS

| | | | |
|---|---|---|---|
| 3,063,977 | 11/1962 | Holdsworth et al. .............. | 260/87.5 |
| 3,256,256 | 6/1966 | Reding et al....................... | 260/87.5 |
| 3,373,150 | 3/1968 | Pears et al. ........................ | 260/92.8 |

*Primary Examiner*—Stanford M. Levin
*Attorney, Agent, or Firm*—Cushman, Darby & Cushman

[57] ABSTRACT

Low pressure polymerization of a vinyl halide with 4-methyl pentene-1 is disclosed. The reaction is conducted in an oxygen-free atmosphere at a pressure not in excess of 150 atmospheres absolute at a temperature of from $-5°$ to $+80°$ C., optionally in the presence of a polymerization initiator. The resulting product is transparent, colorless, thermostable and has a melt index of not more than 100.

7 Claims, No Drawings

PREPARATION OF TRANSPARENT AND THERMOSTABLE COPOLYMERS

This application is a continuation-in-part of my now abandoned application Ser. No. 55,969, filed July 17, 1970, which is a continuation-in-part of my now abandoned application Ser. No. 810,820, filed Mar. 26, 1969.

The present invention relates to a process of preparing transparent, colorless and thermostable copolymers from a vinyl halide and a branched monoolefin.

It is known in the art to polymerize a branched monoolefin and a vinyl halide in order to produce copolymers having improved processing properties. Isobutylene is a particularly suitable branched olefin for this purpose; however, it has the disadvantage that the resulting copolymer possesses very little thermostability, is very brittle and has poor elongation properties. Copolymers of branched mono-olefins and a vinyl halide are disclosed in U.S. Pat. No. 3,063,977. These copolymers also suffer from the disadvantage of brittleness as exhibited by their high melt indexes (considerably in excess of a melt index of 100).

Further, it is known that 4-methyl pentene-1 can be used as a comonomer in the polymerization of vinyl chloride at extremely high pressures (above 1,000 atm.) and at temperatures above 60°C., see for instance, U.S. Pat. No. 3,256,256. The use of these extremely high pressures, however, in the polymerization process necessitates the use of very costly equipment. In addition, the rate of conversion of 4-methyl pentene-1 is only on the order of about 4%.

Now, according to the present invention, it has been found that transparent, colorless and thermostable copolymers can be produced without requiring the use of costly high pressure equipment by polymerizing 4-methyl pentene-1 and a vinyl halide at low pressure and normal temperatures. The rate of conversion of 4-methyl pentene-1 is nearly complete and of the order of about 100%. That the polymerization reaction of this invention can be carried out at such low pressures and normal temperatures to obtain a transparent, colorless and thermostable copolymer is indeed quite surprising, since the only method previously disclosed for copolymerising 4-methyl pentene-1 with a vinyl halide (U.S. Pat. No. 3,256,256) as pointed out above, requires the application of very high pressures.

The process according to the present invention for the preparation of copolymers from a vinyl halide and a branched mono-olefin is characterized in that transparent, colorless and thermostable copolymers are prepared by polymerization of vinyl halides and 4-methyl pentene-1 at a pressure below 150 atm.

It has also been discovered that isoolefins other than 4-methyl pentene-1, for example, 2-methyl butene-1 and 3-methyl butene-1, when polymerized with vinyl chloride under similar reaction conditions of temperature and low pressure, do not give products having acceptable fabricating properties of brittleness and elongation.

Vinyl halides suitable for use according to the present invention are vinyl fluoride, vinyl bromide and preferably vinyl chloride. Mixtures of vinyl halides can also be used if desired, in combination with up to 20 moles percent of one or more other copolymerizable comonomers, for instance vinylidene chloride; vinyl esters, such as vinyl acetate and vinyl stearate; vinyl pyridine; styrene; cetyl vinyl ether; acrylic acid and α-alkyl acrylic acids, such as methacrylic acid and ethacrylic acid, and the nitriles, amides, esters and inorganic salts that are formed from the abovementioned organic acids, by preference the sodium or ammonium salts; allyl compounds, such as allylacetate, allyl chloride and allyl alkyl ethers; ethyl fumarate and ethyl maleate.

The pressure at which, generally, the polymerization can be carried out is not higher than 150 atm. and preferably a pressure corresponding to the vapor pressure of the monomers employed and of the distributing agent (if used) at the prevailing polymerization temperature, which pressure is somewhere between about 1 and 25 atm.absolute.

The temperature at which polymerization takes place is between −50°C and +80°C. use being made preferably of temperatures between −40°C and +60°C.

The polymerization can be effected by any of the usual methods, e.g., by a method making use of bulk, solution, dispersion, suspension or emulsion polymerization. Preference is given to a suspension polymerization method, because this method yields a copolymer which, in addition to the properties mentioned above, possesses good electrical properties.

If use is made of a suspension polymerization method, the initiator employed is usually a compound soluble in the monomers employed and yielding free radicals. Suitable initiators are, for example, organic peroxides, such as lauryl peroxide, diisopropyl peroxidicarbonate, benzoyl peroxide or azonitrile derivatives, such as azodiisobutyro nitrile, or mixtures of initiators. A mixture of di-(tert. butyl-4-cyclohexyl)-percarbonate and azodiisobutyro nitrile or lauryl peroxide is preferred. If desired, inorganic peroxides and/or water-soluble accelerators may also be used in addition to the organic initiators. In general, the initiator is used in an amount varying between 0.01 and 5% by weight, preferably between 0.05 and 0.5% by weight, based on the total weight of the monomers.

A dispersion agent used in the suspension polymerization method may be any of the compounds normally applied for the purpose. Very suitable dispersion agents are polyvinyl alcohol, methyl cellulose, and gelatine. By preference, however, use is made of a partly hydrolyzed polyvinyl acetate, for instance, a polyvinyl acetate with a hydrolysis percentage of 86 to 90, such as the products commercially obtainable under the names "Konam 32-88" and "Konam 48-88", and other types of polyvinyl alcohols. The dispersion agent is generally present in an amount of 0.05–0.75% by weight, based on the total weight of monomers.

The aqueous suspension polymerization mixture may contain a wetting agent, for example, in amounts between 0.001 and 1.0, preferably between 0.005 and 0.5% by weight, calculated on the total weight of the monomers. Any of the wetting agents normally employed for the purpose may be used, but preference is given to a polyethylene oxyfatty alcohol having molecular weight of about 1,000 to 2,000, such as for example, "Mulgofen ON 870". A more preferred wetting agent is sodium dioctyl sulphosuccinate, a product which is commercially obtainable under the name "Rapidnetzer 1220 C." This permits the use of less dispersion agent, which at the same time improves the properties of the copolymer. It is an advantage of the present invention that, in order to produce a good copolymer, the aqueous comonomer mixture need not contain any other organic auxiliaries, but a catalyst, a dispersion agent and, if so desired, a wetting agent.

The weight ratio of water to monomer used in carrying out the suspension polymerization process according to the present invention is generally between 1.8:1 and 4:1 or higher.

The degree of acidity of the polymerization mixture depends on the polymerization process to be used. In the case of emulsion polymerization, the pH value is usually maintained between 7 and 11. This pH can be conviently maintained by the use of ammonium bicarbonate buffers. In the case of the preferred suspension polymerization process, the pH value is usually kept between 3 and 8, preferably between 4 and 7. The usual buffers may be employed to maintain the desired pH, for example, an acetic acid sodium acetate, or a secondary sodium phosphate/primary potassium phosphate buffer.

The polymerization may be carried out as a continuous or semicontinuous process, or as a batch process. If desired, the polymerization may be effected in two or more steps, whether or not using different temperatures.

The particle size of the resulting copolymers depends on the polymerization technique applied. If so desired, the particle size may be changed by application of special means.

The choice of the ratio of 4-methyl pentene-1 to vinyl halide or the mixture of vinyl halide and other monomers is usually such that the resulting copolymer contains 0.1 to 9% by weight, preferably 2 to 5% by weight of the 4-methyl pentene-1.

During or after the polymerization, the usual additives may be added to the copolymers made by the process of the invention, although this is not necessary. Suitable additives are stabilizers, lubricants, pigments, fibrous and/or non-fibrous fillers, and, if necessary, plasticizers. It is also possible to add polymers, for example, chlorinated polyolefins, chlorinated polyvinyl halides, or acrylonitrile- or methacrylonitrile-butadiene-styrene polymers.

The resulting copolymers, in the form of, for example, a mass suitable for moulding or extrusion, may be given the shape of tablets, powders, granules, sheets, strands, etc., and can be subjected to further treatment, should this be desired.

The copolymers obtained by the process according to the invention can be used for the production of articles such as, for example, bottles, films, and corrugated sheets.

The molecular weight of the resulting copolymers is given as the K-value according to Fikentscher, the method of determination of which is described in Cellulosechemie 13 (1932), p. 58.

The static thermostability of a copolymer was determined on a test specimen taken from a rolled sheet with a thickness of approximately one-half mm., obtained by rolling at 170°C, of the copolymer after addition of 2% by weight of an organic barium/cadmium stabilizer ("Flomax 25"). The time needed for the test specimen, placed in an oven with air circulation at 170 °C, to reach visible discoloration was determined in minutes; this time was a measure of the thermostability of the sample. To facilitate the color evaluation of the test specimens leaving the oven, they were first compressed at 170 °C to a thickness of exactly one-half mm.

The Brabender melt viscosity and the dynamic stability were measured by means of a Brabender Plastograph, type FD 0234 H, substantially consisting of two kneader arms rotating at different speeds. The samples to be examined were mixed, in the powdery form, with 2% by weight of an organic tin stabilizer ("Advastab 17 M") and 1% by weight of a glycerol monoricinolate ester ("Loxiol G 10") as a lubricant. The measurements were carried out at a temperature of 210 °C and kneader arm speeds of 45 and 30 r.p.m. The measure of the Brabender melt viscosity was the torque applied to a kneader arm (in gram-meters) at the moment the sample was fully plasticized. The measure of the dynamic thermostability was the time (in minutes) elapsing between the moment of full plasticiation and the moment the polymer melt turned black.

The Brabender viscosity values thus obtained can be converted to a melt index according to ASTM method 1238 - 52 T. The melt index is inversely related to the molecular weight of the polymer; e.g., higher molecular weight polymers generally have a lower melt index and lower molecular weight polymers having a higher melt index. Melting point and viscosity also have an affect on the melt index.

The E-modulus was measured according to ASTM-D 790-61, the tensile strength according to ASTM-D 638-61 T (type 1 test specimen) and the (Izod) impact strength according to ASTM-D 256-56 (thickness of test speciment 3mm.).

The light transmission was determined on a specimen with a thickness of 1.5mm. obtained by rolling at 170°C. for some minutes 100 parts by weight of the copolymer, 2 parts by weight of an organic tin stabilizer (Advastab 17 M), and 1% by weight of a glycerol monoricinolate ester as a lubricant (Loxiol G 10) and next compressing the specimens from the rolled sheet at 170°C. The light transmission was the ratio between the transmitted and the incident light; it was measured according to ASTM-D 1003 by means of a Gardner Photometer.

In the following examples, the percentages of conversion values are calculated on the sum of the monomers present. Unless otherwise indicated, all parts and percentages are by weight.

EXAMPLES 1–3

Under oxygen-free conditions, and under pressure, a 3-liter stainless steel reactor provided with a stirrer received, successively, 1 liter of oxygen-free distilled water, an initiator mixture consisting of 1 g. of azodiisobutyronitrile and 1 g. of di-(tertiary butyl-4-cyclohexyl)-percarbonate and 0.5 g. of largely (88%) saponified polyvinyl acetate. After the vinyl chloride and the 4-methyl pentene-1 were fed in, polymerization was carried out at 55°C. for a period of 19½ hours. The pH value is about 4. During the polymerization stirring took place at 800 r.p.m. after the polymerization had been terminated, the copolymer was separated off by filtration, washed with water, and then vacuum-dried at 50°C.

Table 1 gives some further polymerization conditions and some of the properties of the copolymers made.

TABLE 1

|  | Example 1 | Example 2 | Example 3 |
|---|---|---|---|
| Amount of vinyl chloride added (g) | 485 | 480 | 475 |
| Amount of 4-methyl pentene-1 added (g) | 15 | 20 | 25 |
| Pressure (atm) | 9.0 | 8.1 | 8.5 |
| Incorporation of 4-methyl pentene-1 (% by weight) | 3.7 | 5.9 | 6.8 |
| K-value | 54 | 51 | 50 |
| Static thermostability (min) | 30 | 30 | 30 |
| Dynamic stability (min.) | 31 | 43 | 37 |
| Brabender viscosity (gram-meters) | 780 | 670 | 630 |
| Melt index | 76 | 58 | 77 |
| Light transmissions (%) | 86 | 86 | 85 |

EXAMPLES 4 and 5

The procedures of Example 1 were repeated, but 2 g. of azodiisobutyronitrile was used as the initiator, and the amount of polyvinyl acetate added was 0.75 grams. Polymerization was carried out at temperatures of 50° and 56°C. respectively, for 18½ hours. The results are shown in Table 2.

Table 2

|  | Example 4 | Example 5 |
|---|---|---|
| Pressure (atm.) | 7.9 | 8.3 |
| Conversion (%) | 73.4 | 69.0 |
| Incorporation of 4-methyl pentene-1 (% by weight) | 4.1 | 4.3 |
| K-value | 58 | 53 |
| Static thermostability (min.) | 45 | 30 |
| Dynamic stability (Min.) | 25 | 24 |
| Brabender viscosity (gram-meters) | 1160 | 850 |
| Melt index | 1.9 | 17 |
| Light transmission (%) | 86 | 86 |

EXAMPLES 6–8

The process according to Example 1 was repeated, but 490 g. of vinyl chloride and 10 g. of 4-methyl pentene-1 were used, and an initiator consisting of a mixture of azodiisobutyronitrile and di-(tertiary butyl-4-cyclohexyl)-percarbonate, in the amounts shown in the table below. Polymerization was carried out at 50°C. for 22½ hours. The results are shown in Table 3.

Table 3

|  | Example 6 | Example 7 | Example 8 |
|---|---|---|---|
| Amount of azodiisobutyronitrile (g) | 1.0 | 1.0 | 1.0 |
| Amount of di-(tertiary butyl-4-cyclohexyl)-percarbonate (g) | 1.0 | 0.7 | — |
| Pressure (atm.) | 7.5 | 7.8 | 7.7 |
| Conversion (%) | 80.8 | 83.8 | 83.4 |
| Incorporation of 4-methyl pentene-1 (% by weight) | 2.5 | 2.4 | 2.4 |
| K-value | 57 | 59 | 61 |
| Static thermostability (Min) | 45 | 45 | 45 |
| Dynamic stability (Min) | 25 | 22 | 19 |
| Brabender viscosity (gram-meters) | 1040 | 1180 | 1370 |
| Melt index | 4.4 | 1.9 | 0.4 |
| Light transmission (%) | 85 | 86 | 86 |

EXAMPLES 9 and 10

Under oxygen-free conditions, and under pressure, the reactor as used in Example 1 received, successively, 1 liter of freshly distilled water, 1 gram of partial saponified polyvinyl acetate, 1.25 g. of lauryl peroxide. The amounts of vinyl chloride, 4-methyl pentene-1, and isobutylene (used for comparison), added are given below. Polymerization was carried out at 50°C. for 66 hours. Table 4 also gives some further polymerization conditions and some properties of the copolymers prepared.

Table 4

|  | Example 9 | Example 10 |
|---|---|---|
| Vinyl chloride (g) | 475 | 475 |
| Isobutylene (g) | 25 | — |
| 4-methyl pentene-1(g) | — | 25 |
| Pressure (atm.) | 11 | 7.3 |
| Conversion (%) | 69.0 | 67.2 |
| Incorporation of the comonomer (% by weight) | 7.3 | 7.4 |
| K-value | 47 | 61 |
| Brabender viscosity (gram-meters) | 280 | 1300 |
| Melt index | above 400 | 0.7 |
| Static thermostability (min.) | 0 | 45 |
| Dynamic stability (min.) | 16 | 25 |
| Impact strength (kg./cm$^2$) | 1.1 | 1.7 |
| E-modulus (kg/cm$^2$) | 31,950 | 31,000 |
| Tensile strength (kg/cm$^2$) | 400 | 560 |

EXAMPLES 11–13

Under oxygen-free conditions, a 3-liter stainless steel reactor as used in Example 1 received vinyl chloride (485 g.) and 15 grams of 2-methyl butene-1, 3-methyl butene-1 and 4-methyl pentene-1 respectively. The polymerization was conducted at 57° C. for a period of 14 hours, and under pressure. Table 5 gives further reaction conditions and some properties of the copolymers prepared.

|  | Example 11 | Example 12 | Example 13 |
|---|---|---|---|
| vinyl chloride (g.) | 485 | 485 | 485 |
| 2-methyl butene-1 (g.) | 15 | — | — |
| 3-methyl butene-1 (g.) | — | 15 | — |
| 4-methyl pentene-1 (g.) | — | — | 15 |
| Pressure (atm.) | 8.2 | 8.2 | 7.9 |
| K-value | 44.7 | 47.4 | 54.3 |
| Melt index | 650 | 290 | 27 |

As shown in the above examples, isoolefins other than with 4-methyl pentene-1 have been found to yield products having essentially high melt indices, that is melt indices above about 100, whereas practice according to this invention consistently yields polymers with a melt index below about 100.

What is claimed is:

1. Process for preparing thermostable copolymers of a vinyl halide and 4-methyl pentene-1 having a melt index not exceeding about 100 comprising copolymerizing under oxygen-free conditions a vinyl halide and 4-methyl pentene-1 in a ratio such that the resulting copolymer contains from 0.1 to 9% by weight of 4-methyl pentene-1, at a pressure below about 15 atm, at a temperature between $-50°$ C and $+80°$ C and in the presence of a polymerization initiator of a compound soluble in the monomers and producing free radicals.

2. Process according to claim 1, wherein the vinyl halide used is vinyl chloride.

3. Process according to claim 1 wherein the polymerization is effected by an aqueous suspension polymerization process.

4. Process according to claim 1 wherein the polymerization initiator comprises a mixture of di-(tertiary butyl-4-cyclohexyl)-percarbonate and azodiisobutyronitrile or lauryl peroxide.

5. Process accordingn to claim 3 wherein the aqueous monomer mixture does not contain any other organic auxiliary but an initiator, a dispersion agent and optionally a wetting agent.

6. Process according to claim 1, wherein the resulting copolymer contains 2 to 5% by weight of 4-methyl pentene-1.

7. Process according to claim 1, wherein the polymerization is effected at a temperature between $-40°$ C and $+60°$ C.

* * * * *